April 1, 1941.  R. I. HUFFMAN  2,237,034
HANDLE STRUCTURE FOR SADIRONS AND THE LIKE
Filed Jan. 9, 1939
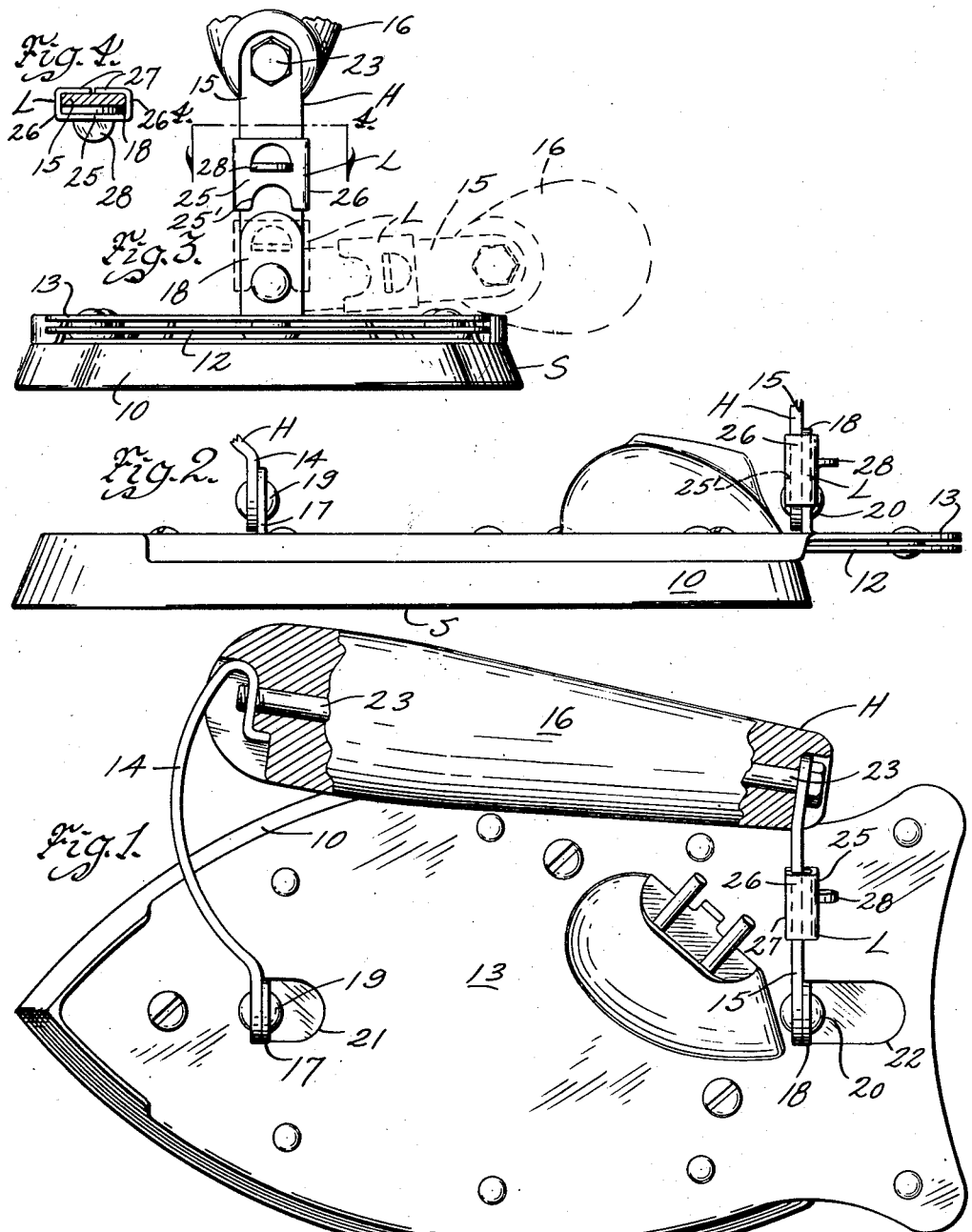
Inventor
Russell I. Huffman
by Bair & Freeman
Attorneys Patented Apr. 1, 1941

2,237,034

UNITED STATES PATENT OFFICE 2,237,034

HANDLE STRUCTURE FOR SADIRONS AND THE LIKE

Russell I. Huffman, Dover, Ohio, assignor to Knapp-Monarch Company, St. Louis, Mo., a corporation of Missouri Application January 9, 1939, Serial No. 249,841

4 Claims. (Cl. 38—90)

An object of my invention is to provide a handle structure for sadirons and the like, which is comparatively simple and inexpensive to manufacture.

A further object is to provide a handle which is so pivoted to the sadiron that it may be swung from an upstanding position for use to a supine position whereby the iron is "folded" into a small space for transportation, the iron being thereby particularly adapted for use of travelers.

A further object is to provide a handle structure having novel means of positively locking it in upstanding position relative to the sadiron when it is desirable to use the iron.

Still a further object is to provide locking means in the form of an element engageable with a handle support and with an ear extending upwardly from the sadiron to which the handle support is pivoted when the handle support and the ear are in alignment with each other, the locking element thereupon preventing pivotal movement of the handle support relative to the iron.

Another object is to support the locking element in a slidable manner on the handle support so that it can be slid from and to locking position as desired.

Other objects, purposes and characteristic features of my present invention will be in part obvious from the accompanying drawing and in part pointed out as the description of the invention progresses. In describing the invention in detail, reference will be made to the accompanying drawing, in which like reference characters designate corresponding parts throughout the several views, and in which:

Figure 1 is a plan view of a handle structure for sadirons and the like embodying my invention and showing the handle in supine or folded position.

Figure 2 is a side elevation thereof showing the handle in raised position, the upper portion of the handle being omitted to conserve space on the drawing.

Figure 3 is a rear elevation showing the handle in raised position for use and by dotted lines in the folded position; and Figure 4 is a sectional view on the line 4—4 of Figure 3.

On the accompanying drawing I have used the reference character S to indicate generally a sadiron and H a handle therefor. The sadiron S comprises a sole plate 10 and cover plates 12 and 13. The handle H comprises handle supports 14 and 15 and a hand grip portion 16.

Upstanding ears 17 and 18 are provided to which the handle supports 14 and 15 are pivoted by rivets or the like 19 and 20. The upstanding ears 17 and 18 may be punched out of the cover plate 13 and bent upwardly thus leaving openings 21 and 22 illustrated in Figure 1.

The handle supports 14 and 15 are connected to the hand grip portion 16 in any suitable manner such as by a bolt 23. The bolt 23 extends through the support 15 and is threaded at its forward end in the support 14.

The handle H may assume either the supine position shown in Figure 1 and by dotted lines in Figure 3 or the upright position for use shown by solid lines in Figure 2 as desired. This is obvious from the pivotal connections at 19 and 20. In order to lock the handle H in its upright position, I provide a locking element L which consists of a piece of heavy sheet metal shaped and formed as illustrated on the drawing. Specifically it includes a back wall 25, a pair of side flanges 26 and a pair of front flanges 27 extending toward each other. An operating lip 28 is cut out of the back wall 25 and bent out to a position convenient for manuipulation by the operator when desired.

The locking element L is supported on the handle support 15 by being slidably mounted thereon. It may assume the position shown in Figure 1 (dotted in Figure 3) when the handle H is in its folded position. When the handle is swung up to its upright position as shown by solid lines in Figure 3, the locking element L will be carried to the full line position and will then drop by gravity to the dotted position where its flanges 26 engage the sides of the handle support 15 and the ear 18 which at this time are in alignment with each other. Notches 25' in the walls 25 and flanges 27 permit clearance for the rivet 20 when the element L is in locking position.

The locking element L will thereupon serve as a means to fix the handle relative to the sadiron so that the sadiron can be used. After the iron is used and when it is desirable to fold the handle down again, the lip 28 may be engaged and lifted so as to release the locking element from the ear 18.

Having described one specific embodiment of my handle structure together with the operation thereof, I desire it to be understood that this form is selected to facilitate the disclosure of the invention rather than to limit the number of forms which it may assume. It is to be further understood that various modifications, adaptations and alterations may be applied to the specific form disclosed to meet the requirements of practice without in any manner departing from the spirit and scope of the invention, except as set forth in the claims appended hereto.

I claim as my invention:

1. In a handle structure for sadirons and the like, a sadiron including an ear upstanding with respect thereto, a handle pivoted to said ear and adapted to assume an upright position for use or a supine position during transportation of said sadiron and means for locking said handle in upstanding position comprising a sleeve on said handle adjacent said ear and slidably movable to a position surrounding both the handle and said ear when the handle and ear are aligned with each other, said sleeve having a lug projecting at substantially right angles from a surface thereof to be engaged by the fingers of the user to slidingly manipulate said sleeve.

2. In a handle structure for sadirons and the like, a sadiron having a pivot supporting element, a handle adapted to swing into an upright position for use or a supine position, a pivot pin through said element and said handle to permit such swinging, and means for locking said handle in upstanding position comprising a sleeve thereon adjacent said pivot supporting element and slidably movable to a position surrounding both the handle and the element when the handle is raised and thereby aligned with said element, said sleeve having notches to receive said pivot pin and thereby permit said sleeve to extend past the center thereof.

3. In a handle structure for sadirons and the like, a sadiron, a handle pivoted thereto, one of the pivotal connections having a substantially vertical ear upstanding from the sadiron, said handle comprising a hand grip portion and a pair of handle supports, one of said handle supports being pivoted to said ear and having a portion aligned with the plane of the ear, said handle being adapted to assume an upright position for use or a supine position and means for locking said handle in upright position comprising a strip of metal disposed in sleeve shape and slidable on said portion of said handle support adjacent said ear said strap of metal being positionable surrounding both said portion and said ear when said portion and said ear are aligned with each other and having a cutout portion extending away from the plane of the strip to serve as a handle for sliding the strip.

4. In a handle structure for sadirons and the like, a sadiron including a flat vertical ear, a handle comprising a hand grip portion and a pair of handle supports, one of said handle supports having a flat portion pivoted to said ear and arranged parallel to the plane thereof whereby said handle may assume either an upright position for use or a supine position and means for locking said flat portion of said handle in the first mentioned position of the handle comprising a sleeve on said flat portion and slidably movable relative thereto to a position surrounding both said flat portion and the ear when they are registered with each other.

RUSSELL I. HUFFMAN.